United States Patent [19]

Ido

[11] Patent Number: 5,447,626
[45] Date of Patent: Sep. 5, 1995

[54] WATER ACTIVATOR

[75] Inventor: Katsutomi Ido, Gifu, Japan

[73] Assignee: Electron Property Research Institute Co., Gifu, Japan

[21] Appl. No.: 286,649

[22] Filed: Aug. 5, 1994

[30] Foreign Application Priority Data

Aug. 9, 1993 [JP] Japan ................... 5-197547

[51] Int. Cl.$^6$ .............................................. C02F 1/48
[52] U.S. Cl. ................... 210/243; 210/282; 204/302
[58] Field of Search ............... 210/748, 192, 222, 223, 210/243, 282, 469; 204/186, 302

[56] References Cited

U.S. PATENT DOCUMENTS

| | | | |
|---|---|---|---|
| 4,176,061 | 11/1979 | Stopka | 210/192 |
| 4,490,252 | 12/1984 | Brigante | 210/222 |
| 4,680,114 | 7/1987 | Hayes | 210/192 |
| 4,941,962 | 7/1990 | Inone | 210/243 |
| 5,128,043 | 7/1992 | Wildermuth | 210/243 |
| 5,326,446 | 7/1994 | Binger | 210/748 |

FOREIGN PATENT DOCUMENTS

| | | |
|---|---|---|
| 48-19025 | 11/1973 | Japan. |
| 55-55742 | 10/1978 | Japan. |
| 58-86138 | 11/1983 | Japan. |
| 60-246771 | 12/1985 | Japan. |

Primary Examiner—Thomas Wyse
Attorney, Agent, or Firm—Hamilton, Brook, Smith & Reynolds

[57] ABSTRACT

The present invention provides a water activator for treating tap water under an electrostatic field to activate the tap water. The water activator of the invention includes: an insulating base (1); a power unit (2) mounted on the insulating base (1) and having an insulating transformer (12) disposed therein; an electrode plate (11) placed on a top face of the power unit (2) and covered with an insulating material (11a); and a tank unit (3) replaceably mounted on the power unit (2), the tank unit (3) having a water reservoir (14) for storing tap water and a cock (17) attached to a lower end of the water reservoir (14). One end of a secondary output voltage of the insulating transformer (12) is insulated and disconnected while the other end of the secondary output voltage is connected to the electrode plate (11). The insulating transformer (12) in the power unit (2) generates and leads a high voltage to the electrode plate (11) so as to form a high-tension electrostatic field in the water reservoir (14) of the tank unit (3), thereby activating the tap water stored in the water reservoir (14). The treated and activated tap water spouts from the cock (17) attached to the lower end of the water reservoir (14).

8 Claims, 6 Drawing Sheets

F I G. 4
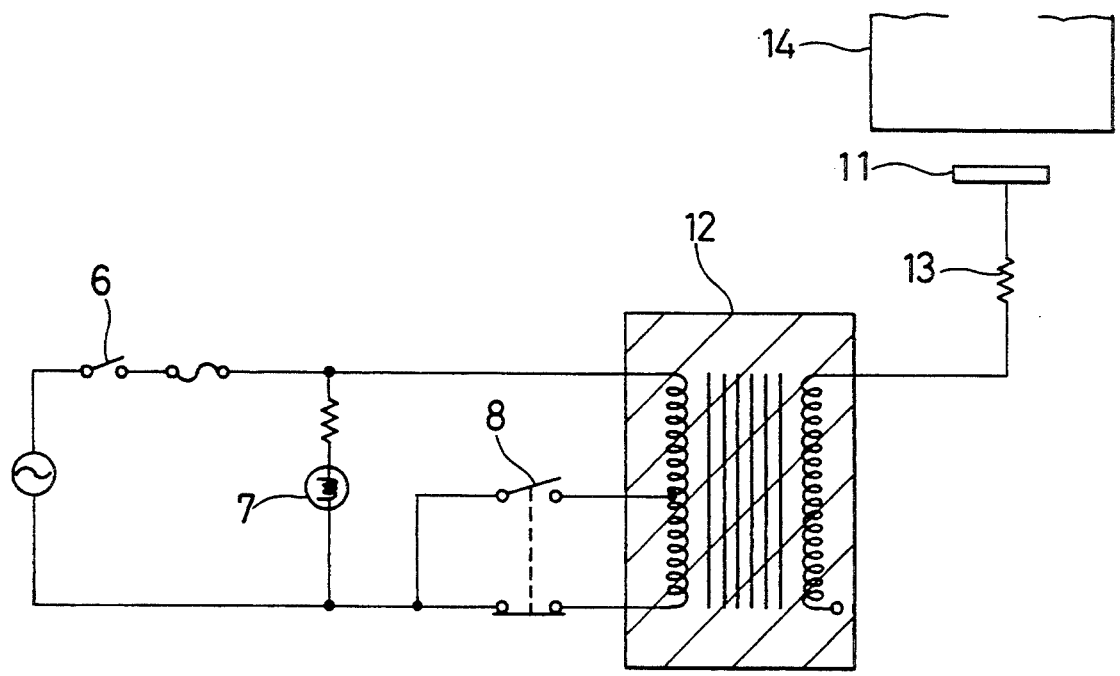

Primary

Secondary

WATER ACTIVATOR

BACKGROUND OF THE INVENTION

Field of the Invention

The present invention relates to a system for treating tap water under an electrostatic field and activating the tap water.

Description of the Related Art

Water treatment systems using active carbon, coral sand, or natural stone as a treatment medium have been widely known and used by people who have concerns about the quality of their drinking water. The long-term use of such a treatment medium, however, causes adhesion of contaminants contained in tap water, which may result in breeding of bacteria in the treatment medium. Regular replacement of the treatment medium is thereby essential for the effective water treatment. Some treatment media are not expected to exert the preferable water treatment effects accompanied with modification of a water molecular structure. Water activators for activating tap water with electronic energy have thus been proposed to solve such problems. One example of the proposed water activators disclosed in JAPANESE PATENT LAYING-OPEN GAZETTE No. S-59-102832 is shown in FIG. 6 as a prior art. In the water activator of FIG. 6, an output electrode 122 of a high potential electrostatic generator 121 is connected to an electrode plate 125 via a lead wire 126. The electrode plate 125 is placed in a water reservoir 124 which is kept under non-ground conditions by a large insulator 123.

The prior art system has the electrode plate 125 placed inside the water reservoir 124 and accordingly requires wiring between the high potential electrostatic generator 121 and the water reservoir 124. This makes the structure of the whole system rather complicated and consumes time and labor for replacement of the water reservoir 124. The electrode plate 125 is always in contact with water ill the water reservoir 124, and only limited materials can thus be used for the electrode plate 125.

SUMMARY OF THE INVENTION

One object of the present invention is thus to provide a novel water activator having a simple structure for easily activating tap water.

Another object of the invention is to provide a space-saving and easily operable water activator.

The invention is directed to a water activator which includes: an insulating base; a power unit mounted on the insulating base and having an insulating transformer disposed therein, the power unit having a top face, a bottom face, and a side face; an electrode plate placed on and integrally formed with the top face of the power unit and covered with an insulating material; and a tank unit replaceably mounted on the power unit, the tank unit having a water reservoir for storing tap water and a cock attached to a lower end of the water reservoir. One end of a secondary output voltage of the insulating transformer is insulated and disconnected while the other end of the secondary output voltage is connected to the electrode plate. The insulating transformer in the power unit generates and leads a high voltage to the electrode plate so as to form a high-tension electrostatic field in the water reservoir of the tank unit, thereby treating tap water with the electrostatic field so as to activate the tap water stored in the water reservoir. The activated tap water spouts from the cock attached to the lower end of the water reservoir.

The water activator preferably includes one or a plurality of active carbon cartridges, which are replaceably placed in the water reservoir of the tank unit for removing contaminants contained in the tap water.

The tank unit further includes an outer cover for accommodating and protecting the water reservoir. The water reservoir may be composed of stainless steel whereas the outer cover may be composed of a synthetic resin.

The insulating base is, for example, composed of a synthetic marble having excellent insulating ability, and formed to have a shape of substantially flat, truncated pyramid. The insulating base has a positioning projection into which the bottom face of the power unit is fitted.

When a high potential is applied to the electrode plate integrally formed with the power unit, a high-tension electrostatic field is generated in tap water stored in the water reservoir of the tank unit mounted on the power unit according to the principle of electrostatic induction. The water activator of the invention does not require wiring between the power unit and the tank unit, thereby realizing a simple and space-saving structure and allowing the tank unit to be freely attached to and detached from the power unit. The active carbon cartridge placed in the water reservoir effectively removes contaminants such as chlorine contained in tap water. The outer cover for accommodating and protecting the water reservoir prevents dews on the surface of the water reservoir and improves the appearance of the tank unit.

These and other objects, features, aspects, and advantages of the present invention will become more apparent from the following detailed description of time preferred embodiment with the accompanying drawings.

BRIEF DESCRIPTION OF THE DRAWINGS

FIG. 4 is an electric circuit diagram of the water activator;

DESCRIPTION OF THE PREFERRED EMBODIMENT

Figure 1:
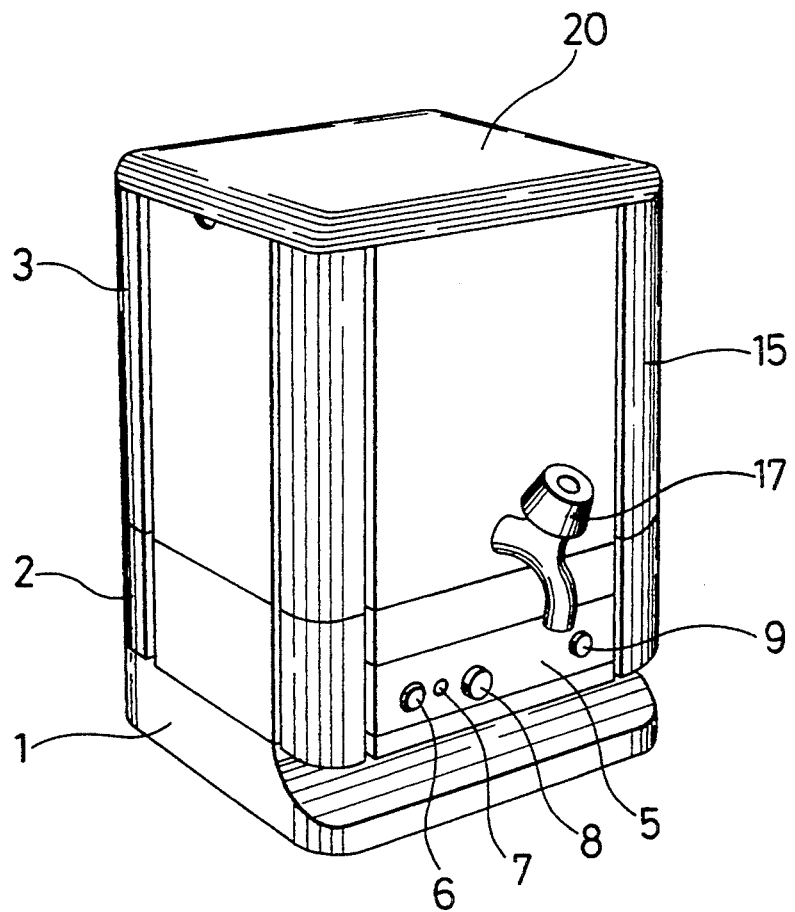
FIG. 1 is a perspective view illustrating a water activator embodying the invention.
Figure 2:
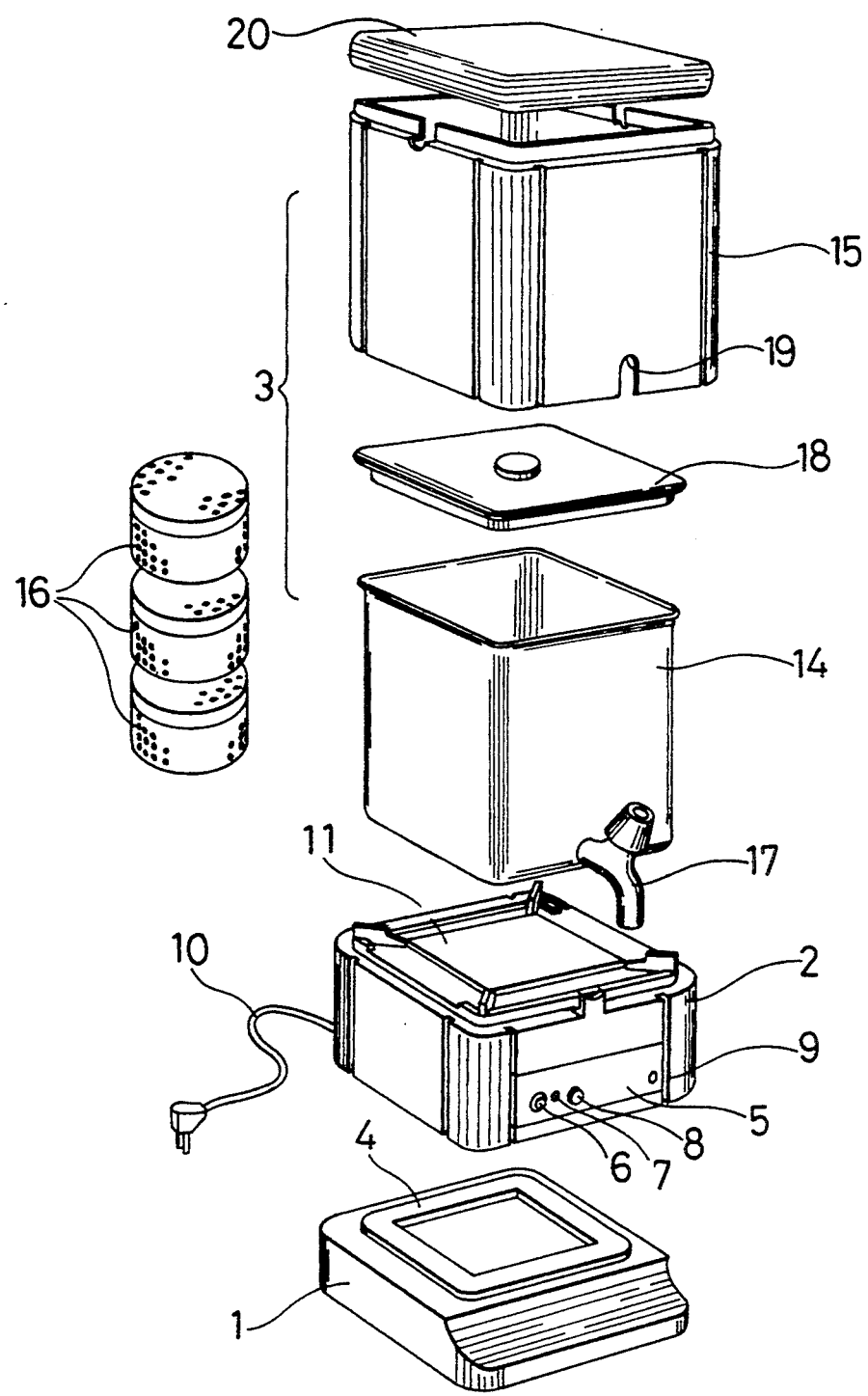
FIG. 2 is a decomposed perspective view illustrating the water activator of FIG. 1.

A water activator embodying the invention includes an insulating base 1, a power unit 2, and a tank unit 3 as illustrated in FIGS. 1 and 2. The insulating base 1 has a shape of a substantially flat, truncated pyramid and is preferably composed of a synthetic marble having excellent insulating ability. A positioning projection 4 is formed on a top face of the insulating base 1.

Figure 3:
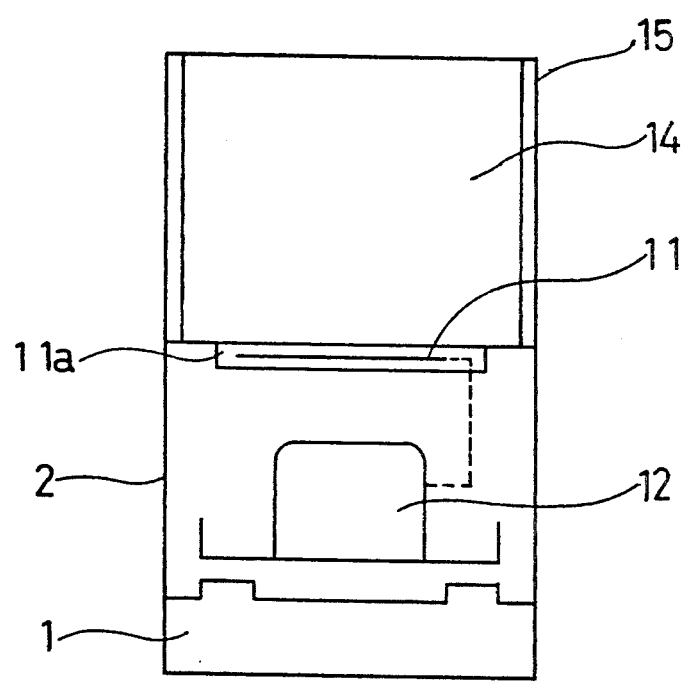
FIG. 3 is a cross sectional view schematically showing a fundamental structure of the water activator.

The power unit 2 includes a box-type housing generally composed of a synthetic resin and is provided with an on-off switch 6, an indicator light 7, a high-low selector 8, and fuse holder 9 on a front control panel thereof. The power unit 2 also has a power cord 10 and a grounding terminal (not shown) on a rear panel thereof, and an electrode plate 11 covered with a synthetic resin insulating member 11a on a top face thereof (see FIG. 3).

With referring to FIG. 4, an insulating transformer 12 disposed inside the power unit 2 raises a primary voltage of 100 volts to generate a secondary voltage of 2.8 kV. While one end of a secondary output voltage is insulated and disconnected, the other end of the secondary output voltage is electrically connected to the electrode plate 11 to allow the output voltage of the insulating transformer 12 to be adjusted with the high-lower selector 8. A protective resistance 13 of approximately 1 megohms is interposed between the insulating transformer 12 and the electrode plate 11.

With referring again to FIG. 2, the tank unit 3 includes a stainless steel water reservoir 14 for storing tap water and an outer cover 15 for accommodating and protecting the water reservoir 14, both of which are replaceably mounted on the electrode plate 11. Three active carbon cartridges 16 are replaceably placed in the water reservoir 14.

The water reservoir 14 composed of stainless steel has a shape of a quadratic tube with a bottom. The water reservoir 14 is provided on a lower end thereof with a cock 17 from which activated water spouts, and has a transparent inner lid 18 for allowing the user to check the amount of tap water stored in the water reservoir 14 and keeping moisture from leaking out. The outer cover 15 is composed of a synthetic resin and formed to have a shape similar to that of the water reservoir 14. The outer cover 15 has a notch 19 where the cock 17 is fitted in as well as an outer lid 20 as a dirt cover.

Figure 5A:
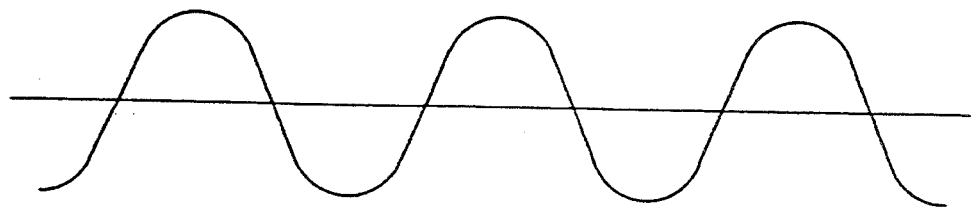
FIG. 5A shows a waveform of a primary voltage.
Figure 5B:
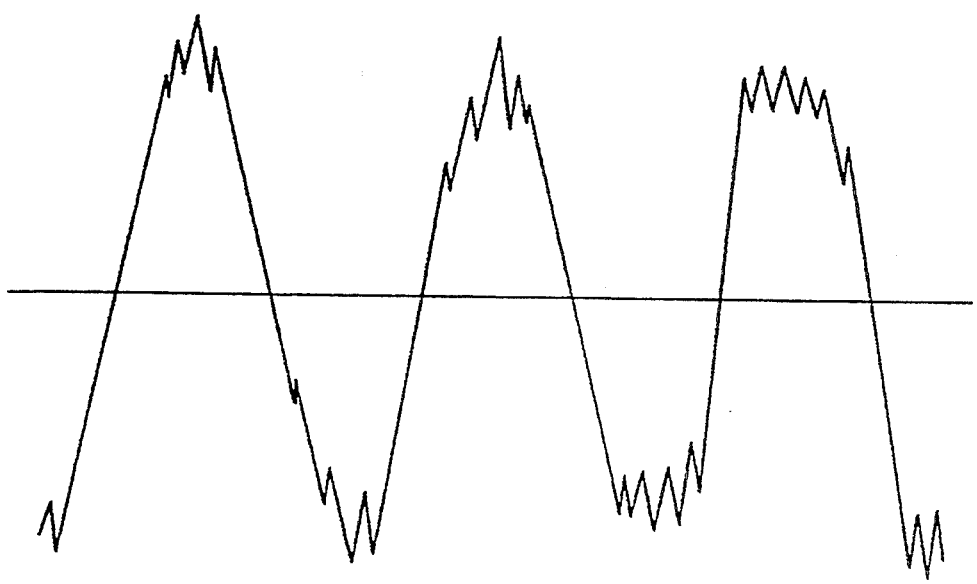
FIG. 5B shows a waveform of a secondary voltage.
Figure 6:
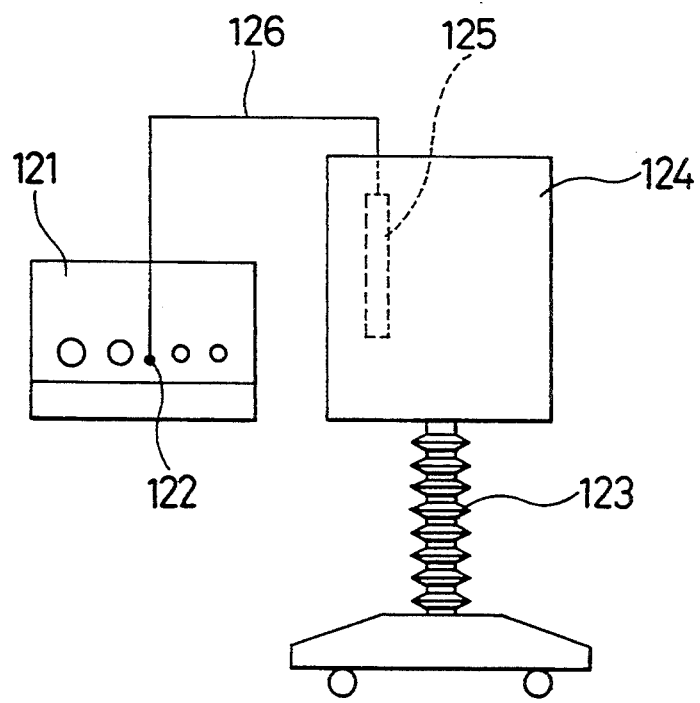
FIG. 6 schematically shows a structure of a prior art water activator.

The water activator of the embodiment thus constructed includes the electrode plate 11 integrally formed with the power unit 2. This structure does not require wiring between the power unit 2 and the tank unit 3 and allows the tank unit 3 to be freely attached to and detached from the power unit 2. A high voltage generated by the insulating transformer 12 of the power unit 2 and led to the electrode plate 11 results in a high-tension electrostatic field formed in the water reservoir 14 according to the principle of electrostatic induction. The electrostatic field activates tap water for a relatively short time. Fully treated, activated water can spout from the cock 17 of the water reservoir 14 after four-hour treatment. Harmonic distortion is observed in the secondary output voltage of the insulating transformer 12 as illustrated in FIGS. 5A and 5B, which gives preferable activation conditions.

Tap water treated with the water activator of the embodiment consists of water molecules activated with electronic energy and exerts the following effects:

(1) Treated water has high permeability with little cluster aggregation;
(2) Treated water has weak alkaline properties;
(3) Treated water has high energy with the enhanced proper frequency;
(4) Treated water includes anions electrically well balanced with cations;
(5) Treated water has good taste; and
(6) The active carbon cartridges 16 effective prevent contaminants such as chlorine contained in tap water.

In the water activator of the embodiment, the power unit 2 is mounted on the substantially flat insulating base 1. This keeps the water activator, for example, mounted on a table, under stable conditions and ensures efficient water treatment with effectively preventing electrons from escaping into the table. The outer cover 15 for accommodating and protecting the water reservoir 14 prevents dews on the surface of the water reservoir 14 and improves the appearance of the tank unit.

The water activator of the embodiment has the electrode plate integrally formed with the power unit and accordingly does not require wiring between the power unit and the tank unit, thereby realizing a simple and space-saving structure and allowing the tank unit to be freely attached to and detached from the power unit. Tap water stored in the water reservoir is treated with a high-tension electrostatic field generated according to the principle of electrostatic induction. The active carbon cartridges placed in the water reservoir effectively remove contaminants such as chlorine contained in tap water.

The water activator of the embodiment is preferably applicable to treat water in commercial use for keeping vegetables, fruits, and fish sufficiently fresh, water for bathing or washing, and water given to flowers and plants as well as drinking water. In any application, activated water exerts excellent effects as described previously.

There may be many modifications, alternations, and changes without departing from the scope or spirit of essential characteristics of the invention. It is thus clearly understood that the above embodiment is only illustrative and not restrictive in any sense. For example, the housing of the power unit, the material and shape of the water reservoir, and the secondary voltage of the transformer may be modified according to the requirements.

The scope and spirit of the present invention are limited only by the terms of the appended claims.

What is claimed is:

1. A water activator comprising
   an insulating base,
   a power unit mounted on said insulating base and having a transformer disposed therein, said power unit having a top face, a bottom face, and a side face,
   an electrode plate placed on the top face of said power unit and covered with an insulating material, and
   a tank unit replaceably mounted on said power unit, said tank unit having a water reservoir for storing tap water and a cock attached to a lower end of said water reservoir,
   wherein one end of a secondary output voltage of said transformer is insulated and disconnected while the other end of said secondary output voltage is connected to said electrode plate,
   said transformer in said power unit generating and leading a high voltage to said electrode plate so as to form a high-tension electrostatic field in said water reservoir of said tank unit, thereby treating the tap water stored in said water reservoir under the electrostatic field so as to activate the tap water,
   the treated and activated water spouting from said cock attached to the lower end of said water reservoir.

2. A water activator in accordance with claim 1, wherein said electrode plate is integrally formed with said power unit.

3. A water activator in accordance with claim 1, wherein said transformer comprises an insulating transformer having an insulated end on a secondary output side.

4. A water activator in accordance with claim 1, wherein an active carbon cartridge is replaceably placed in said water reservoir of said tank unit for removing contaminants contained in said tap water.

5. A water activator in accordance with claim 1, wherein said tank unit further comprises all outer cover for accommodating and protecting said water reservoir.

6. A water activator in accordance with claim 5, wherein said water reservoir is mainly composed of stainless steel.

7. A water activator in accordance with claim 5, wherein said outer cover is mainly composed of a synthetic resin.

8. A water activator in accordance with claim 1, wherein said insulating base is mainly composed of a synthetic marble having excellent insulating ability, and formed to have a shape of substantially flat, truncated pyramid, said insulating base having a positioning protection into which said bottom face of said power unit is fitted.

* * * * *